United States Patent
Prudvi et al.

(10) Patent No.: US 6,378,048 B1
(45) Date of Patent: Apr. 23, 2002

(54) "SLIME" CACHE COHERENCY SYSTEM FOR AGENTS WITH MULTI-LAYER CACHES (75) Inventors: Chinna Prudvi, Portland; Paul Breuder, Beaverton, both of OR (US); Quinn W. Merrill, Phoenix, AZ (US); Derek Bachand; Harish kumar Kumar, both of Portland, OR (US); Brent E. Lince, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/190,126

(22) Filed: Nov. 12, 1998

(51) Int. Cl.[7] .............................................. G06F 13/00
(52) U.S. Cl. .................... 711/144; 711/122; 711/146
(58) Field of Search ................................. 711/144, 145, 711/146, 122

(56) References Cited

U.S. PATENT DOCUMENTS

| | | | | | |
|---|---|---|---|---|---|
| 5,671,391 A | * | 9/1997 | Knotts | ......................... | 711/146 |
| 5,706,463 A | * | 1/1998 | Ebrahim et al. | ............. | 711/144 |
| 5,706,464 A | * | 1/1998 | Moore et al. | ................ | 711/122 |
| 5,715,428 A | * | 2/1998 | Wang et al. | ................. | 711/141 |
| 5,913,226 A | * | 6/1999 | Sato | ............................ | 711/146 |
| 5,996,049 A | * | 11/1999 | Arimilli et al. | ............. | 711/146 |
| 6,021,468 A | * | 2/2000 | Arimilli et al. | ............. | 711/122 |

OTHER PUBLICATIONS

Pentium Pro Family Developer's Manual, Vol. 1: Specification Chapters 3, 4, and 7, (Date Unknown).
Pentium Pro Family Developer's Manual, Vol. 3: Operating System Writer's Manual Chapters 11 (Date Unknown).

* cited by examiner

Primary Examiner—Glenn Gossage
(74) Attorney, Agent, or Firm—Kenyon & Kenyon (57) ABSTRACT

A cache coherency method, a data eviction method, and a multi-level cache system are disclosed. A copy of data may take one of five states including a shared state, a lazy state, an invalid state, a modified state, and an exclusive state. Based upon the names of these states, the disclosed methods and systems may be labeled "SLIME." The method of cache coherency may include storing a copy of data in a cache and storing state information identifying the copy as being stored in one of the five above-mentioned states. In response to a snoop request related to the data, marking a status field indicative of the state of the data to represent that the data is shared without regard to the data's dirty status. The data eviction method includes storing data in a cache, storing a status field in association with the data, the status field having a first sub-field to indicate whether the data is dirty and a second sub-field to indicate whether the data is shared, when the data is to be evicted from the cache, testing the first sub-field field to determine whether the data is dirty and, if so, writing the data to another cache before evicting the data from the cache. The multi-layer cache system includes first and second caches provided in a layered arrangement with the second cache being in a higher layer than the first cache, each cache including cache entries adapted to store data and status fields associated with the data, the status field representing the state of the data, eviction logic in the first cache adapted to test the status field of a cache entry, and control logic adapted to output the contents of the cache entry to a cache entry in the second cache when the status field indicates that data in the cache entry is dirty.

23 Claims, 3 Drawing Sheets

"SLIME" CACHE COHERENCY SYSTEM FOR AGENTS WITH MULTI-LAYER CACHES

BACKGROUND OF THE INVENTION

The present invention relates to an improved cache coherency scheme in a multi-processor system.

Figure 1:
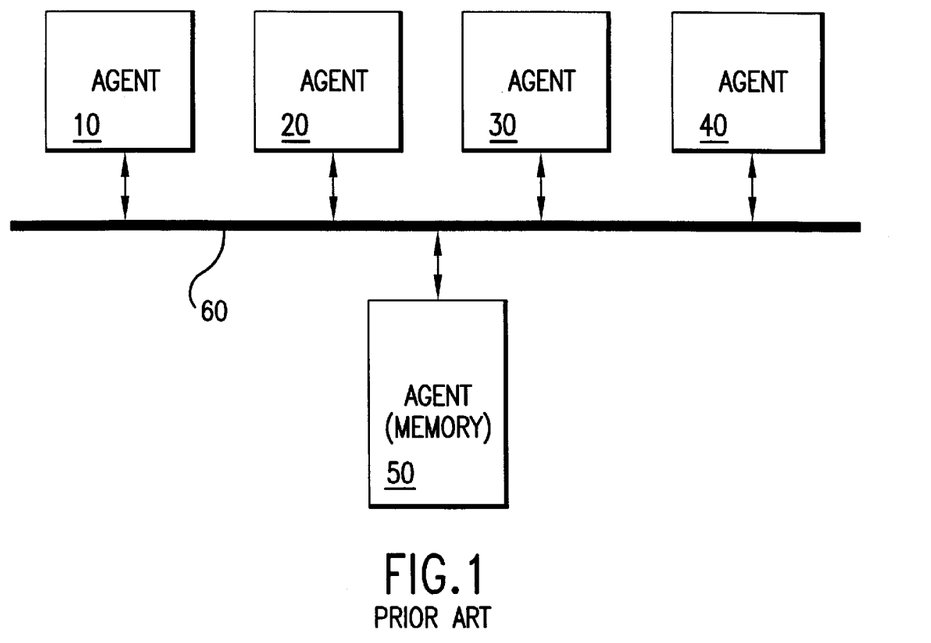
FIG. 1 is a block diagram of a known multi-agent system.

FIG. 1 illustrates a typical multi-processor system having a plurality of agents 10–50. The plurality of agents 10–50 are in communication with each other over a common external bus 60. An "agent" may be anything that communicates over the external bus, including microprocessors, input/output devices, memory systems and special-purpose chipsets or digital signal processors. The agents 10–50 communicate over the external bus 60 using a pre-defined protocol. Typically, one of the agents, such as 50, is a memory storing data. During operation, other agents 10–40 may share the same data. Cache coherency systems ensure that each agent operates on the most current copy of data available.

One such cache coherency system is the MESI (pronounced "messy") system. The MESI system defines four states for data. One of the four states is applied to each copy of data stored in an agent's internal cache(s). The MESI states are:

Invalid—Although the agent may have cached a copy of data, the copy is unavailable to the agent. When the agent requires the data, the agent must fetch the data from external memory 50 or from another cache.

Shared—A cached copy is valid and possesses the same value as is stored in external memory 50. The agent may only read the data. Copies of the data may be stored in the caches of other agents. An agent 10 may not modify data having a shared state without first performing an external bus transaction to ensure that the agent has exclusive control over the copy of data.

Exclusive—The cached copy is valid and may possess the same value as is stored in external memory 50. When an agent 10 caches data having an exclusive state, it may read and write (modify) the data without an external cache coherency check. The data must be invalid in all other agents. The agent that stores data in an exclusive state is guaranteed to have the most up-to-date copy within the system somewhere in its cache hierarchy.

Modified—The cached copy is valid and is dirty. It may be more current than the copy stored in external memory 50. When an agent 10 caches data having a modified state, it may read and write (modify) the data without an external cache coherency check. The data must be invalid in all other agents. The agent that stores data in a modified state is guaranteed to have the most up-to-date copy within the system somewhere in its cache hierarchy.

Only one state may attach to a given copy of data. For example, a single copy of data may not be both modified and shared. However, as described below, a single agent may store copies of data in multiple caches. Some copies may be assigned a different state than other copies in a single agent. Further explanation of MESI principles may be found in the *Pentium Pro-Family Developers Manual,* Volume 1: Specifications, ISBN 1-55512-259-0 (1996).

Figure 2:
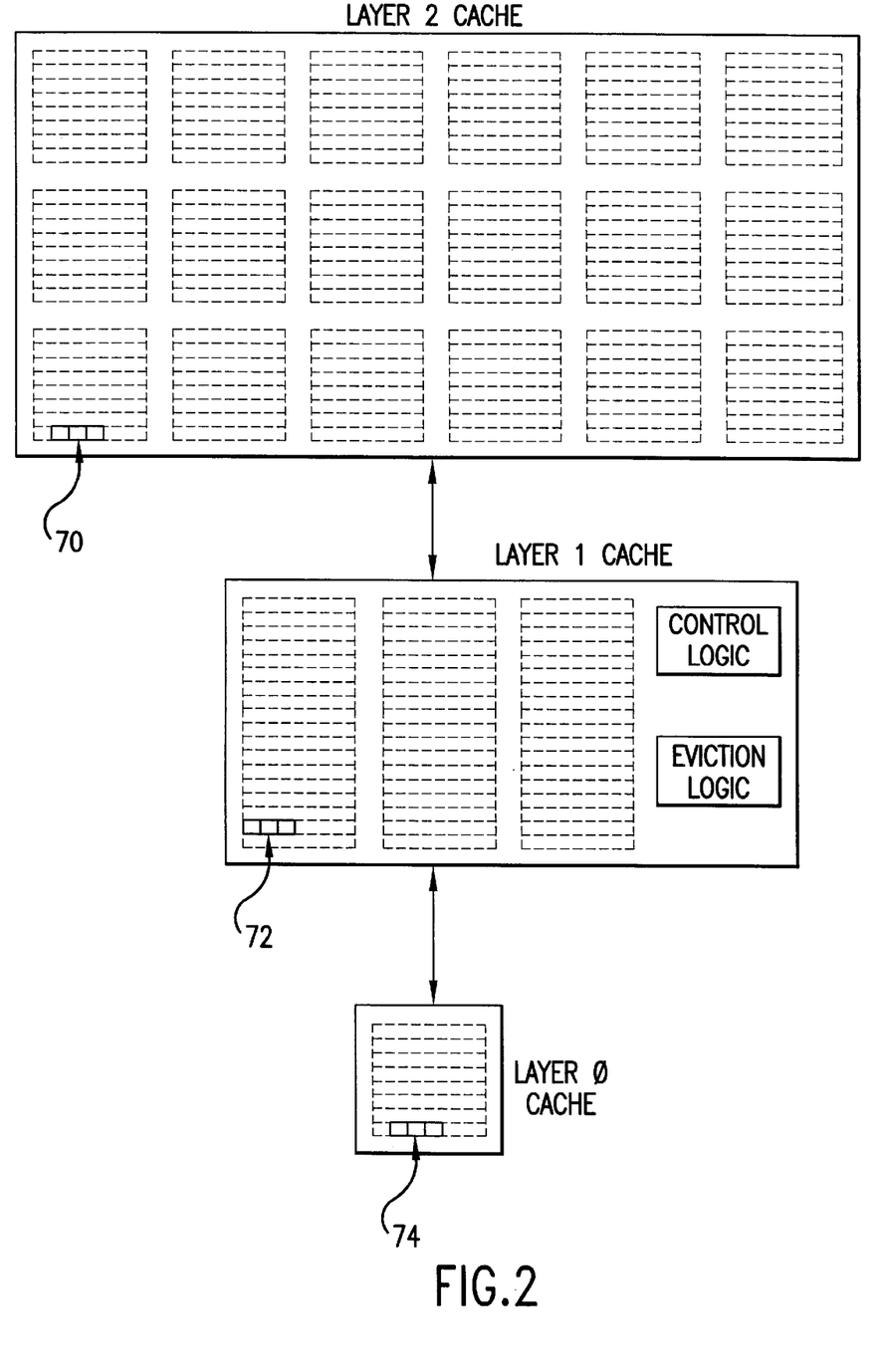
FIG. 2 is a block diagram of a multi-layer cache system of an agent.

FIG. 2 illustrates a multiple cache system that may be used in an agent 10. High performance agents often include multiple caches arranged in layers to reduce the impact of memory latency and bandwidth. A lowest, layer cache ("LØ") typically has a small capacity but is designed to be very fast. One or more higher layer caches L1, L2 typically are larger than the LØ cache but are accessed at a lower frequency. The higher layer caches L1, L2, however, still operate at a much higher frequency than external memory 50. Copies of a single piece of data may be stored in multiple caches. State information is stored with each copy. Further, the state of data may be different in different layers. For example, data may be read into an L1 cache as exclusive data and, later, be read to the LØ cache and modified. The L1 copy remains in an exclusive state even though the LØ copy is in a modified state.

In a multi-layer cache system, the MESI system can cause cache coherency problems within an agent 10. The goal of cache coherency systems is to provide the most current copy of data to any agent that will use the data. Certain data eviction policies can cause an agent to obtain access to stale data.

The state of a copy of data determines how it is evicted from a cache. When a cache is full, new data may not be stored in the cache until old data is "evicted" from the cache. For old data stored in an invalid, exclusive or shared state, eviction occurs simply by writing the new data over the old data. This copy of old data is lost, but it is guaranteed that the same, or possibly more up-to-date copy of data still exits somewhere within the system. For modified data, however, data eviction requires that the modified data be output to a higher layer cache or to a memory before it can be overwritten in the first cache. A copy of data in a modified state could be the only current copy of data in the system. If it were overwritten, the most up-to-date copy of the data could be lost to the system.

Figure 3:
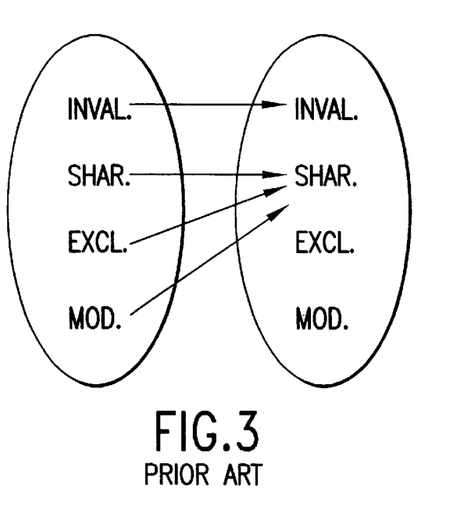
FIG. 3 is an illustration representing MESI state changes in response to a Go-to-Shared snoop.

Under the MESI system, bus transactions from other agents are interpreted by a first agent 10 in one of two ways: The request may be interpreted as a "Go-to-Invalid" snoop which causes the agent 10 to mark all cached copies of the requested data as invalid. Alternatively, the request may be interpreted as a "Go-to-Shared" snoop which causes the agent 10 to mark cached copies of valid data as shared. In either case, when a snoop implicates modified data, the modified data is provided by the first agent 10 to the second agent 20 via an implicit writeback. The MESI state changes resulting from a Go-to-Shared snoop are shown in FIG. 3 in a MESI system. The modified-to-shared transition may cause cache coherency to be broken within the agent.

An agent may obtain access to stale data as shown in the following example. An agent 10 reads in data, such as a counter, and modifies it. According to such a process, the data's initial value may be stored in the L1 cache in an exclusive state and the data's modified value may be stored in the LØ. The data is snooped by another agent 20 as part of a read request. The snoop is interpreted as a "Go-to-Shared" snoop in which the agent 10 marks all matching copies of the data as shared. Also, the current value of the modified copy is written back to the snooping agent 20 and memory 50 by an implicit writeback. Once the modified data is marked as shared, it is subject to the data eviction policies of ordinary shared data.

TABLE 1

|  | Before Snoop | | After Snoop | | After Eviction | |
| --- | --- | --- | --- | --- | --- | --- |
|  | State | Data | State | Data | State | Data |
| External Memory 50 |  | 0 |  | 1 |  | 1 |
| L1 Cache | E | 0 | S | 0 | S | 0 |
| L0 Cache | M | 1 | S | 1 | Overwritten | |

Later, the copy in the LØ cache may be overwritten. However, the stale data in the L1 cache remains. If the agent 10 were to require the data, the agent would obtain and use the stale data from the L1 cache. This causes coherency problems.

Earlier processors have addressed this cache coherency issue. The Pentium® Pro processor, commercially available from Intel Corporation, solved this cache coherency issue by marking as invalid all copies of requested data except one. First, it identified all copies of data that matched the requested data and marked all of them as shared. Second, if modified data were present, then it would go back and mark all stale copies as invalid. This two-step snoop state update also caused problems because it was not atomic. By marking stale data first as shared then as invalid, a small window of time existed when the processor core possibly could gain access to the stale data.

Accordingly, there is a need in the art for a cache coherency scheme in a multi-cache agent that prevents the agent from gaining access to stale data that may be stored in one or more of the agent's caches. Further, there is a need in the art for such a scheme that permits snoop state update; to be atomic.

SUMMARY OF THE INVENTION

Embodiments of the present invention provide a cache coherency scheme in which a copy of data may take one of five states including an invalid state, an exclusive state, a shared state, a modified state and a lazy update state. In the lazy update state, a copy of the data is protected against eviction but is considered shared with other agents.

DETAILED DESCRIPTION

The present invention alleviates the disadvantages of the prior art to a great extent by providing a cache coherency system for agents having multi-layer caches. A copy of data is identified according to whether it is "dirty" and whether it is "shared." Data may be dirty and shared simultaneously. Data that is dirty cannot be evicted from a cache before being written to a higher level cache or external memory. Data that is shared cannot be modified without an external cache coherency check.

According to an embodiment of the present invention, five states of cache coherency may be defined for data. Based upon the names of the states (Shared, Lazy, Invalid, Modified, Exclusive) the inventors have labeled the cache coherency scheme, "SLIME" (pronounced "Slimey").

Invalid—Although a copy of the data may be cached, it is unavailable to the agent 10. Data requests to the cache "miss" and the data must be fetched from external memory 50 or from another cache.

Shared—The cached copy is valid and may possess the same value as in external memory 50. Copies of the data may be cached with other agents 20–40. Shared data may be read without external cache coherency checks. Shared data may not be modified unless exclusive ownership of the data is obtained through an external bus transaction.

Exclusive—The cached copy is valid and may possess the same value as in external memory 50. No other agent 20–40 has cached a valid copy of the data. Exclusive data may be read or modified without external cache coherency checks.

Modified—The cached copy is valid and is more current than the copy stored in external memory 50. No other agent 20–40 has cached a valid copy of the data. Modified data may be read or modified without external cache coherency checks.

Lazy Update ("Lazy")—The cached copy is valid, dirty and shared. Copies of the data may be cached with other agents 20–40. Lazy data may be read without external cache coherency checks. Lazy data may not be modified unless exclusive ownership of the data is obtained through an external bus transaction.

Only one state can attach to a particular copy of data.

A three-bit status field is stored in association with a copy of data, representing the state of the copy. The status field may record the state information for data as shown in the following table:

TABLE 2

|  | Valid | Dirty | Shared |
| --- | --- | --- | --- |
| Invalid | 0 | X | X |
| Exclusive | 1 | 0 | 0 |
| Shared | 1 | 0 | 1 |
| Modified | 1 | 1 | 0 |
| Lazy | 1 | 1 | 1 |

Figure 4:
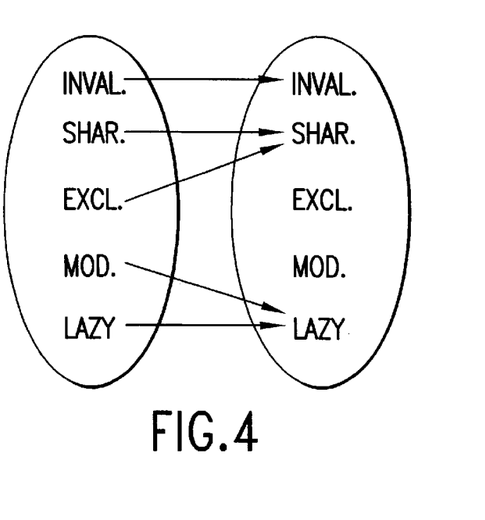
FIG. 4 is an illustration representing SLIME state changes in response to a Go-to-Shared snoop.

FIG. 4 illustrates the state changes that occur in a SLIME system in response to a Go-to-Shared snoop:

Data in the invalid state remains invalid.

Data in the shared state remains shared.

Data in the exclusive state becomes shared.

Data in the modified state becomes lazy. An implicit writeback also occurs.

Data in the lazy state remains lazy.

Where the state information is stored using the format of Table 2, the transitions may be affected simply by enabling the shared bit in the status field.

In one embodiment, eviction policies for lazy data may be applied exactly as if the data were modified data. That is, when evicted, the lazy data is first written back to a higher level cache. Using this control scheme, the lazy data can be made to propagate up through various layers of cache until the data is evicted to external memory 50. Under this policy, however, it is possible that stale data overwrites the implicit writeback data in the external memory.

Consider an example as shown in Table 3. Table 3 illustrates how the SLIME system prevents an agent from getting access to the stale data. As in Table 1, an agent 10 may read data into the L1 cache in the exclusive state and modify the data in the LØ cache. When another agent issues a Go-to-Shared snoop, the agent enables the shared bit in the status field of each copy of data. The agent also outputs the most recent copy of the data in an implicit writeback, updating external memory 50.

TABLE 3

|  | Before Snoop | | After Snoop | | After Eviction | |
| --- | --- | --- | --- | --- | --- | --- |
|  | State | Data | State | Data | State | Data |
| External Memory 50 |  | 0 |  | 1 |  | 1 |
| L1 Cache | E | 0 | S | 0 | L | 1 |
| L0 Cache | M | 1 | L | 1 | Overwritten | |

Thereafter, the LØ copy may be evicted. However, the LØ copy is in the lazy state, the data is written back to the L1 cache. Current data overwrites the stale data in the L1 cache. Thus, the agent cannot get access to the stale data stored in its caches.

Immediately after the Go-to-Shared snoop, the shared data in the L1 cache does not possess the same value as in memory 50. This behavior differs from MESI. Where MESI requires that data in the shared state possess the same value as in external memory, the shared state in the present invention is not subject to such a requirement.

Thus, for purposes of data eviction, data in the lazy state is treated in a manner similar to modified data. Optionally, this treatment may occur in every internal cache. That is, lazy data may continue to propagate to higher levels of cache until the lazy data is evicted entirely from the agent and written back to external memory. According to this option, however, the lazy data also should be treated as modified data when other agents snoop the data. That is, the possibility arises that the stale lazy data may from an intermediate layer cache may be written to external memory before that data was updated from a lower cache. As shown in Table 4 below, stale data may be written to external memory over more current data. The current data is stored in the agent in a lower cache (such as LØ). When another agent snoops the data, the agent that possesses the most current copy of the data should provide the data in another implicit writeback.

TABLE 4

|  | Before Snoop | | After Snoop | | After Eviction | |
| --- | --- | --- | --- | --- | --- | --- |
|  | State | Data | State | Data | State | Data |
| External Memory 50 |  | 0 |  | 2 |  | 1 |
| L1 Cache | M | 1 | L | 1 | Overwritten | |
| L0 Cache | M | 2 | L | 2 | L | 2 |

Alternatively, however, data in the lazy state need not be treated exactly as modified data. That is, data in the lazy state may propagate by writebacks through internal caches but is prevented from being written back to the external memory 50. Such a treatment preserves cache coherency because external memory 50 will have been updated through the implicit writeback that occurred when modified data was snooped to the lazy state. To evict lazy data from any internal cache but the highest layer cache, data in lazy state is treated as modified data. However, when data in the lazy state is to be evicted from the highest layer cache, the data eviction may treat the lazy data as shared. That is, data is not written back to external memory 50. Thus, in this alternative, data in the lazy state is preserved until it is written back to the highest layer cache.

An example is illustrative, shown in Table 5, this time in the context of a three-layer cache. Initially, before the Go-to-Shared snoop, the agent caches a copy of the data in each layer. Stale data is stored in the L1 add L2 caches. After the Go-to-Shared snoop, each copy is marked as shared or lazy and external memory is updated by an implicit

TABLE 5

|  | Before Snoop | | After Snoop | | After First Eviction | | After Second Eviction | |
| --- | --- | --- | --- | --- | --- | --- | --- | --- |
|  | State | Data | State | Data | State | Data | State | Data |
| External Memory 50 |  | 0 |  | 2 |  | 2 |  | 2 |
| L2 Cache | E | 0 | S | 0 | L [S] | 1 | Overwritten | |

TABLE 5-continued

|  | Before Snoop | | After Snoop | | After First Eviction | | After Second Eviction | |
| --- | --- | --- | --- | --- | --- | --- | --- | --- |
|  | State | Data | State | Data | State | Data | State | Data |
| L1 Cache | M | 1 | L | 1 | Overwritten | | Overwritten | |
| L0 Cache | M | 2 | L | 2 | L | 2 | L | 2 |

A first eviction occurs in the L1 cache and a stale copy of the data is written back to the L2 cache. Some time later, a second eviction occurs in the L2 cache. However, eviction of lazy data from the L2 cache is permitted to occur as for exclusive, shared or invalid data. The lazy data is overwritten in the L2 cache. No explicit writeback occurs.

In this second embodiment, when an agent possesses a copy of data in the lazy state, the external memory 50 is guaranteed to possess a current copy of the data as well. Thus, the agent need not respond to external snoops as if it possessed the most current copy of data. It may respond to external snoops as if the lazy data were shared data.

As may be apparent, in this second embodiment, the highest layer cache (L2) need not support the lazy state. When data in lazy state is written back to the L2 cache, the state of the data may be changed to shared (shown in brackets in Table 5). Such an implementation permits state information in the highest level cache to be represented by two bits which, because the highest level cache often is the largest cache in the agent 10, permits a significant amount of area to be conserved when the agent 10 is manufactured as an integrated circuit. Ordinarily, the five SLIME states are represented by a three-bit field 70, 72, 74 (FIG. 2).

Figure 5:
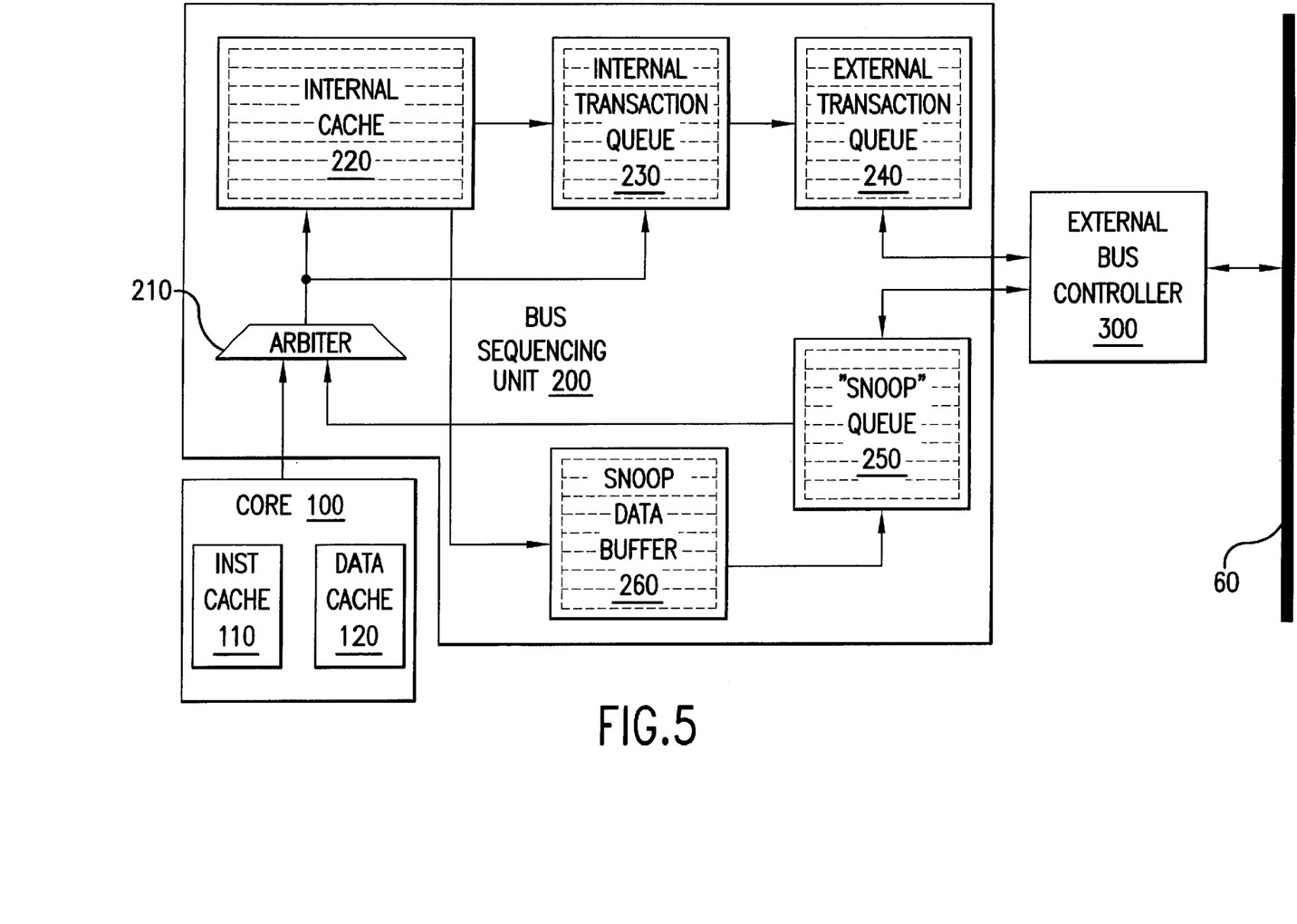
FIG. 5 is a block diagram of an agent constructed in accordance with an embodiment of the present invention.

FIG. 5 illustrates a block diagram of an agent 10 constructed in accordance with an embodiment of the present invention. The agent includes a core 100, a bus sequencing unit ("BSU") 200 and an external bus controller ("EBC") 300. The core 100 executes program instructions and operates on data as part of its execution and possesses two caches. A first cache 110 stores program instruction data, which generally is not modified. A second cache 120 stores data to be read and/or modified during execution of the program instructions. This second cache 120 or, alternatively, the first and second cache 110, 120, considered together, constitute an LØ cache.

The BSU 200 includes an arbiter 210, an internal cache 220, an internal transaction queue 230, an external transaction queue 240, a snoop queue 50 and a snoop data buffer 260. The system shown in FIG. 5 is only a two layer cache, wherein the core cache 110, 120 corresponds to an LØ cache and the internal cache 220 corresponds to an L1 cache.

The arbiter 210 receives requests for data from various parts of the agent 10. For example, as shown, the arbiter 210 receives requests from the core 100 and from the snoop queue 250. The arbiter 210 selects one of the requests and outputs it to the remainder of the BSU 200.

The internal cache 220 stores data, both program instructions and variable data. The internal cache 220 possesses logic (not shown) that responds to requests from the arbiter 210 and determines whether it possesses the requested data. If so, it generates signals indicating that the request "hit" the internal cache 220; otherwise, it generates a signal indicating that the request "missed" the internal cache 220.

The internal transaction queue 230 receives all requests from the arbiter 210. The internal transaction queue 230 stores the requests long enough for the internal cache 220 to indicate whether the request hit or missed the internal cache 220. Requests that hit the internal cache 220 are so marked in the internal transaction queue 230. When a request advances out of the internal transaction queue 230, it is routed to the external transaction queue 240 only if the request missed the internal cache 220.

The external transaction queue 240 receives requests from the internal transaction queue 220, which missed the internal cache 220. The external transaction queue 240 buffers requests to be placed on the external bus 60. When a request advances out of the external transaction queue 240, it is routed to the external bus controller 300 and posted on the external bus 60. The external transaction queue 240 monitors requests in progress and routes data to and from the bus 60 and the various caches 110, 120, 220 as determined by the transaction.

The snoop queue 250 buffers external bus transactions and interfaces with components within the agent to determine whether any external bus transaction implicates data in the agent. A snoop data buffer 260 stores data to be output to the external bus 60 pursuant to an implicit writeback.

The external bus controller 300 drives data on the external bus 60. It also monitors data driven on the external bus 60 by other agents. For example, new transactions posted on the external bus 60 by other agents are read by the external bus controller 300 and routed to the snoop queue 250 for cache coherency checks. Additionally, data driven onto the external bus 60 by other agents 20–40 in response to a transaction posted by the first agent 10 is routed back to the external transaction queue 240 by the external bus controller 300.

SLIME cache coherency checks begin when another agent 20 posts a transaction request on the external bus 60. Typically, the external bus protocol may require that the agent 10 return snoop results within a predetermined time after the request is posted. The snoop queue 250 receives the request from the external bus controller 300, decodes it and determines whether the request must be snooped internally within the agent 10. If so, it buffers the request in a snoop queue entry and issues a snoop probe to all caches 110, 120 and 220 in the agent 10. The snoop probe identifies the address of data implicated by the request, a snoop queue identifier (ID), a snoop probe type and a snoop data buffer ID. The snoop queue ID identifies where in the snoop queue the request has been buffered. The snoop data buffer ID identifies where in the snoop data buffer 260 data should be stored pursuant to an implicit writeback. The snoop probe type identifies whether the snoop is a Go-to-Shared snoop or a Go-to-Invalid snoop. The snoop probe also may be delivered to the various queues in the agent, such as the internal and external transaction queues 230, 240.

The caches 110, 120, 220 (and optionally, the internal and external transaction queues 230, 240) possess logic that permits each to determine whether it possesses a copy of the requested data that is modified, shared or both. Each cache returns a probe response to the snoop queue 250 identifying the status of its copy of the requested data, if any. On a Go-to-Shared snoop, any cache that possesses a copy of the requested data marks the data as shared (enables the shared bit in the status field). The snoop queue 250 causes the external bus controller 300 to drive snoop response signals on the external bus 60 indicating whether the agent 10 possesses a copy of the requested data and whether it will provide a copy of the data in an implicit writeback.

As described above, an implicit writeback occurs if the agent possesses a copy of data in the modified state and, optionally, in the lazy state. In embodiments where data in the lazy state is written back to the external memory, data in the lazy state causes an implicit writeback.

Data for an implicit writeback is stored in the snoop data buffer 260. If two caches store data to be written back, the copy from the lower layer cache is read into the snoop data buffer 260. Eventually, the snoop queue 250 reads data out of the snoop data buffer 260 to the external bus controller 300 to be output to the, external bus 60.

Eviction of data in the lazy state from either core cache 110, 120 causes the data to be written back from the respective cache to the internal cache 220 as described above. The core caches possess logic that, before overwriting a cache entry, tests the valid and dirty bits of the state information.

In the system of FIG. 5, internal cache 220 is the highest layer cache. The internal cache 220 possesses logic 280 to test the state bits of data to be evicted. Modified data is detected when the valid and dirty bits are both enabled but the shared bit is disabled. Modified data is evicted through a writeback to external memory 50.

Depending upon implementation, data in the lazy state may or may not be written back to external memory 50 when evicted. In an embodiment where lazy data is to be written back to the external memory 50, the internal cache 220 may omit logic to test the shared bit. If both the valid and dirty bits of victim data are enabled, the victim data is in either a modified or a lazy state and must be written back.

When data is to be written back, the internal cache possesses additional logic to generate a request to the arbiter 210 to have data written to external memory. The request is transferred through the internal transaction queue 230 to the external transaction queue 240 for implementation. Once the writeback has begun and the victim data has been read out of the internal cache 220, the new data may overwrite the victim data in the cache.

In a multi-layer system, the SLIME system permits snoop probes to be made atomic. Remember that in the prior art systems, when multiple copies of data were found during a Go-to-Shared snoop probe, all copies but one are marked as invalid in a two-step process. Under the SLIME system, however, state transitions are made independently of the presence of matching data in other caches. The status field of all matching copies are remarked to enable the shared bit regardless of the state in which the data was originally stored. The SLIME system permits Go-to-Shared state updates to be made atomic; they occur in a single operation.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. In a multi-agent computer system, a method of cache coherency, comprising:
   storing a copy of data in a cache of an agent,
   storing state information of the copy, the state information identifying the copy as being stored in one of five states, the states including:
   an invalid state indicating that the copy is invalid in the cache,
   an exclusive state indicating that the agent is the only agent to possess a valid copy of the data,
   a shared state indicating that the copy may be shared with other agents,
   a modified state indicating that the copy is more current than a copy stored in external memory, and
   a lazy state indicating that the copy is protected from eviction in the cache and may be shared with other agents.

2. The cache coherency method of claim 1, further comprising, for a copy of data marked as invalid, marking the state information in the invalid state in response to a Go-to-Shared snoop request related to the copy.

3. The cache coherency method of claim 1, for a copy of data marked as shared, marking the state information in the shared state in response to a Go-to-Shared snoop request related to the copy.

4. The cache coherency method of claim 1, for a copy of data marked in the exclusive state, changing the state information to the shared state in response to a Go-to-Shared snoop request related to the copy.

5. The cache coherency method of claim 1, for a copy of data marked in the modified state, changing the state information to the lazy state in response to a Go-to-Shared snoop request related to the copy.

6. The cache coherency method of claim 1, for a copy of data marked in the lazy state, maintaining the state information in the shared state in response to a Go-to-Shared snoop request related to the copy.

7. The cache coherency method of claim 1, wherein the state information includes a first field representing whether the data is shared and a second field representing whether the data is dirty.

8. The cache coherency method of claim 7, further comprising enabling the first field in response to a go-to-shared snoop request related to the copy.

9. A cache coherency method, comprising:

storing data in a cache, storing a status field associated with the data, the status field representing whether the data is dirty and whether the data is shared, responsive to a snoop request related to the data, marking the status field to represent that the data is shared without regard to the data's dirty status.

10. The cache coherency method of claim 9, wherein the cache coherency request is associated with a Go-to-Shared snoop.

11. The cache coherency method of claim 9, wherein the status field is a multi-bit field including a first bit position representing the data's status as dirty and a second bit representing the data's status as shared.

12. A data eviction method, comprising:

storing data in a first cache, storing a status field in association with the data, the status field having a first sub-field to indicate whether the data is dirty and having a second sub-field to indicate whether the data is shared, when the data is to be evicted from the first cache, testing the first sub-field to determine whether the data is dirty and, if so, writing the data to a second cache before evicting the data.

13. The data eviction method of claim 12, wherein the testing occurs without regard to the contents of the second sub-field.

14. The data eviction method of claim 12, wherein the first and second caches are provided in a layered arrangement, the second cache being in a higher layer than the first cache.

15. The data eviction method of claim 12, wherein the status field is stored in the first cache.

16. The data eviction method of claim 12, further comprising copying the status field to the second.

17. The data eviction method of claim 16, wherein the status field is a multi-bit field including a first bit representing the data's status as dirty and a second bit representing the data's status as shared, the method further comprising clearing the dirty bit of the copy of the status field in the second cache.

18. A method of cache coherency in an agent, comprising:

storing a copy of data in a cache, storing state information associated with the copy, the state information representing whether the copy is dirty and whether the copy is shared, responsive to a snoop request, marking the state information to represent that the data is shared without regard to the copy's dirty status.

19. The method of claim 18, wherein the state information includes a first bit representing whether the copy is dirty and a second bit representing whether the copy is shared.

20. A multi-layer cache system, comprising:

first and second caches provided in a layered arrangement with the second cache being in a higher layer than the first cache, each cache including cache entries adapted to store data and a status field associated with the data, the status field in an associated cache entry in the first cache including a first bit position that represents whether data in the associated cache entry is dirty and a second bit position that represents whether data in the associated cache entry is shared, eviction logic in the first cache adapted to test the first bit position of the status field of a cache entry in which data is to be written, and control logic adapted to output the contents of the cache entry in the first cache in which data is to be written to a cache entry in the second cache, when the dirty bit indicates that data in the cache entry in the first cache in which data is to be written is dirty.

21. The cache system of claim 20, wherein the status field associated with the data of a cache entry of the second cache includes a first bit position that represents whether the data of the cache entry of the second cache is dirty and a second bit position that represents whether the data of the cache entry of the second cache is shared.

22. The cache system of claim 20, wherein the status field associated with the data of a cache entry of the second cache is a multi-bit status field.

23. The cache system of claim 20, wherein the control logic operates without regard to the status of the second bit in the status field of the cache entry in the first cache.

* * * * *

UNITED STATES PATENT AND TRADEMARK OFFICE
CERTIFICATE OF CORRECTION

PATENT NO. : 6,378,048 B1
DATED : April 23, 2001
INVENTOR(S) : Chinna Prudvi et al.

It is certified that error appears in the above-identified patent and that said Letters Patent is hereby corrected as shown below:

<u>Title page,</u>
Item [75], Inventors, change "Harish kumar Kumar" to -- Harish Kumar --.

<u>Column 10,</u>
Line 4, change "second." to -- second cache. --.

Signed and Sealed this

Eighth Day of April, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,378,048 B1
DATED : April 23, 2002
INVENTOR(S) : Chinna Prudvi et al.

It is certified that error appears in the above-identified patent and that said Letters Patent is hereby corrected as shown below:

<u>Title page,</u>
Item [75], Inventors, change "Quinn W. Merrill" to -- Quinn W. Merrell --.

Signed and Sealed this

Twenty-fourth Day of June, 2003

JAMES E. ROGAN
*Director of the United States Patent and Trademark Office*